Aug. 28, 1956  A. C. BOND  2,760,295
CASTING BOBBER
Filed Aug. 4, 1953
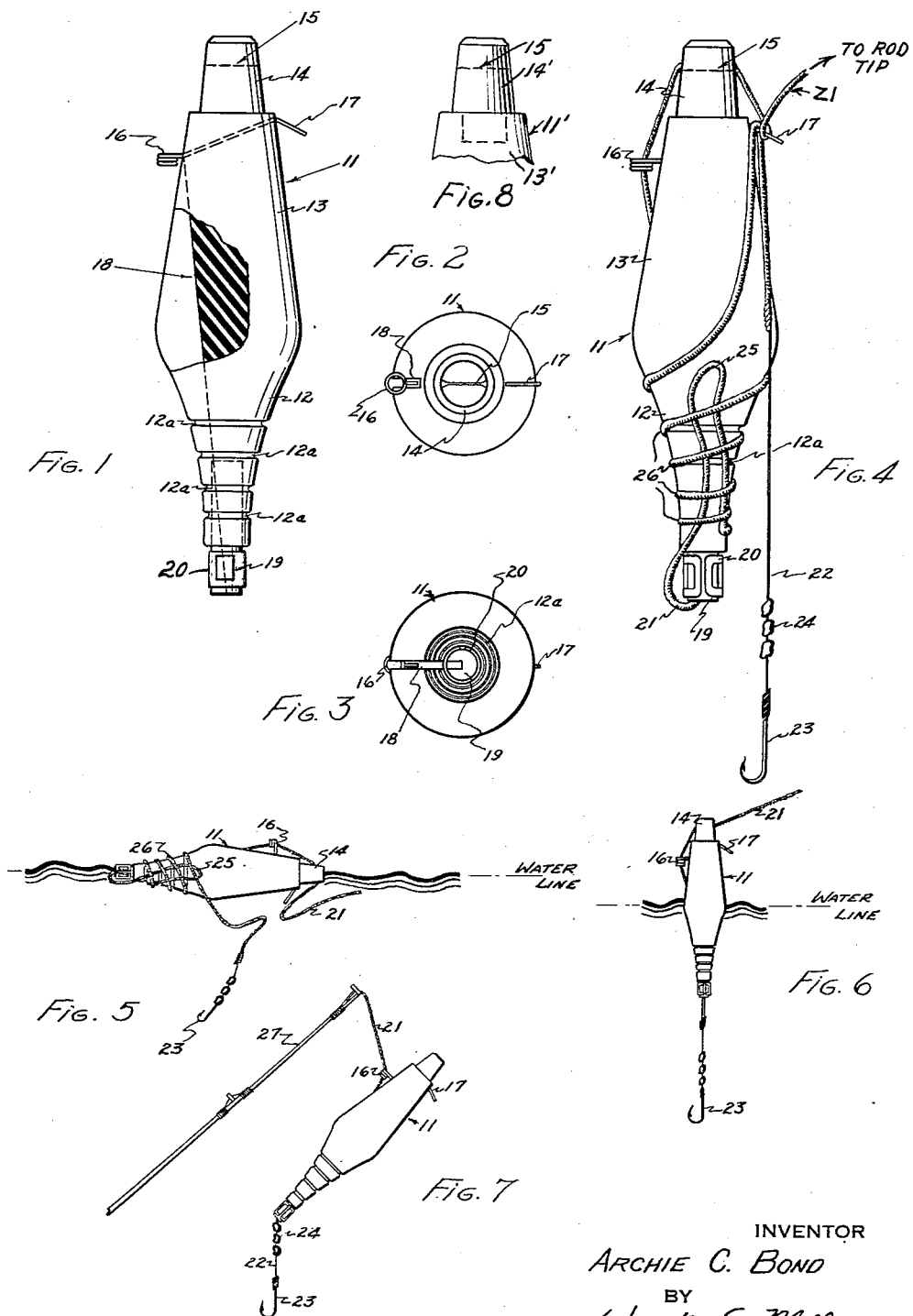
INVENTOR
ARCHIE C. BOND
BY
Winston E. Miller
ATTORNEY

United States Patent Office 2,760,295
Patented Aug. 28, 1956

2,760,295
CASTING BOBBER

Archie C. Bond, St. Johns, Mich.; Joyce B. Bond, administratrix of said Archie C. Bond, deceased Application August 4, 1953, Serial No. 372,252

5 Claims. (Cl. 43—43.11)

The present invention relates to a new and improved fishing bobber, especially adaptable for use in casting.

Heretofore bobbers have been variously adapted for use in still fishing but when inventors have attempted to adapt a bobber for casting, the static conditions attending still fishing are gone and the variable dynamic factors in the casting operation are encountered. No known device has heretofore successfully surmounted the problems encountered in casting a bobber. It is essential that the bobber and rigging be approximately equal in weight to conventional casting plugs so that a balance is properly maintained between rod, reel and line to give good casting characteristics.

Further, it is necessary that the device be simply rigged so as to be readily operable in the field by men of average skill and ability.

Further, is is necessary that the casting bobber be of such simplicity and construction as to eliminate the snarling of line, leader, and bobber during all phases of the casting operation and to create a minimum of surface agitation upon righting itself in the water.

Finally, it is desirable to provide a casting bobber which may be reeled in in the manner of a plug. This requires that the casting bobber slip along the line and leader as the line is reeled in. Such a casting bobber must have good floating characteristics and be capable of holding the line, leader, sinkers and bait as it floats without slippage on the line.

It will be seen that my invention provides a device which overcomes the aforementioned criticisms of previous casting bobbers and the overcoming of which are advantages over the previous casting bobbers. These and other advantages will be increasingly apparent to those skilled in the art as the description proceeds.

Figure 1 is a front elevation of my casting bobber without rigging with a portion of the body cut away to reveal the groove 18.

Figure 2 is a plan view of my casting bobber taken from the top without rigging.

Figure 3 is a plan view of the casting bobber taken from the bottom without rigging.

Figure 4 is a front elevation showing the casting bobber rigged, preparatory to casting.

Figure 5 is a side elevation showing the disengagement of the rigging when the bobber strikes the water after being cast.

Figure 6 is a side elevation showing the bobber floating in the normal fishing position.

Figure 7 is a side elevation showing the bobber reeled in near the rod tip.

Figure 8 is a fragmentary side elevation showing a modified upper extension.

Referring more particularly to the drawings the buoyant bobber body 11 is generally circular in cross section if viewed along any line taken at right angles to its vertical axis. The side elevation of the bobber 11 indicates an elongated external configuration having a bottom half 12 of generally conical shape and a top half 13 of generally conical shape so that where the conical halves are merged they are of the same diameter. The above external description is that of matching cones, although in fact the bobber body 11 is preferably turned from a single piece of wood, plastic, cork or other buoyant material, but may be buoyantly fashioned or molded from hollow materials such as molded plastics or spun metal. The bottom half 12 of the body 11 is provided with a plurality of line grooves 12a to prevent line slippage when the bobber is rigged for use. The conical half 13 of bobber 11 is substantially a frusto-conical shape having a reduced diameter or step terminating in a substantially frusto-conical shaped upper extension 14. The upper extension 14 is flat on top, being truncated along a plane perpendicular to the vertical axis of the body. As indicated in the drawing, Figure 1, the upper extension 14 is integral with the bobber body 11 although in some modifications as shown in Figure 8, for example, the upper extension 14' might be fashioned of material separate from the bobber body 11' and inserted or affixed to the top half 13' of the bobber body 11'. A notch 15 is cut in the upper extension 14 which bisects the top of the upper extension 14 and forms a tight V by way of its sharp taper in a plane paralleling the vertical axis of the bobber body 11. The form and function of this notch 15 will be remarked about as the description proceeds. Slightly down from the upper extension 14 and piercing the top half 13 of the bobber body 11 is the snake guide 16 and the pin 17. In the preferred embodiment, as shown in the drawing, the same material which forms the snake guide 16 penetrates the vertical axis of the bobber body 11 and emerges opposite the snake guide side of the bobber body 11 to form the slightly downturned pin 17. The snake guide 16 and the pin 17 are aligned in the same plane as the notch 15 in the cap 14. Commencing at the snake guide 16 is a groove 18 which extends the length of the bobber body 11. The bottom half 12 of the bobber body 11 terminates in a cylindrical shank 19 which is split by the continuation of the groove 18. Slidably and rotatably affixed over the shank 19 is a split retaining sleeve 20 for closing and opening the groove 18. The cylindrical shank 19 may be made integral with the bobber body 11, but a preferred embodiment is that shown in Fig. 1 where the shank 19 is a seasoned hickory dowel grooved upon one side to coincide with the running groove 18.

In operation the fishing line 21 is passed through the guide 16 and measured out so that the desired depth of line below the bobber body 11 extends free of the bobber body 11. The line 21 when thus measured is drawn securely into the notch 15. The portion of the line hanging free is attached conventionally to a leader 22 and a hook 23 and sinkers 24 are conventionally affixed. Then the line 21 is passed through the groove 18, the split retaining sleeve 20 being rotated to permit the line to extend the length of the groove. Then the retaining sleeve 20 is rotated to close the groove at the shank 19. The line 21 is thus held by the notch 15 but is free running through the guide 16 and groove 18, and the line 21 is prevented from moving laterally out of the groove 18 by the retaining sleeve 20.

A loop 25 is formed from the line 21 hanging free of the bobber body 11, which loop 25 is laid up upon the tapered lower half 12 of the bobber body 11. The loop (25) is retained by winding the excess of line 21, in the manner of a spinning top, upwards along the tapered bottom half 12 of the bobber body 11. The windings 26 are retained in position by the line grooves 12a so that slippage is prevented. The winding 26 is continued until the free length of line is shortened to a point near the sinker 24 and hook 23. Then the line is passed over the slightly downturned pin 17 and the sinkers 24 and hook 23 on the remaining leader 22 are permitted to hang down in pendant fashion as shown in Fig. 4. Then the line 21 on the rod tip side of the notch 15 is passed under the pin 17 securely retaining the leader 22 from release and by reason of tension in the line 21 between the pin 17 and the notch 15 the line 21 will not pull free of the notch 15. This manner of rigging is best shown in Fig. 4 preparatory to casting.

Slack in the line 21, as the bobber 11 strikes the water, permits the release of the sinker weighted end of the line from the pin 17 as best shown in Fig. 5. As the sinker 24 drops, the line 21 is spooled off of the bottom half 12 of the bobber body 11 in an orderly manner which minimizes surface disturbance. The bobber 11 then assumes the normal floating position as shown in Fig. 6. When it is desired to reel in the line to inspect the bait, remove a fish, or recast, a slight jerk is given to the line 21 by a sudden movement of the rod tip 27 when the line 21 is taut. This jerk frees the line from the notch 15 and the bobber 11 moves down the full length of the line 21 and leader 22 until it strikes the obstruction of the sinkers 24 or hook 23. In this manner, the bobber 11 is reeled in to the casting rod tip 27 along with its collateral tackle. In similar manner the tackle is prepared for another cast.

This device is simple and economical to produce and is much more effective as a casting bobber than devices heretofore existing. It extends the range of still fishing to bait casting equipment and eliminates the surface agitation heretofore existing where complicated rigging and design have failed.

Having thus described my invention, I claim:

1. A casting bobber including an elongated buoyant body having a gripping notch at its top end, a series of line grooves around the lower half of said body in spaced relation, a longitudinally grooved shank extending from the lower end of said body, and a longitudinal groove in planal alignment with the groove in said shank, and extending substantially the length of said body; a guide piercing said body near the top thereof; a downturned pin opposite and above said guide; and a retaining sleeve rotatably mounted on said shank to close the groove therein.

2. A casting bobber as set forth in claim 1 wherein said grooved shank is a separable cylindrical element insertable into the lower body portion of said bobber body and having the groove aligned with the said longitudinal groove in the bobber body.

3. A casting bobber as set forth in claim 1 wherein said guide and said downturned pin are a member forming said guide on one end and a downturned pin on the other end passing transversely through the bobber body, the external portions being in planal alignment with the longitudinal groove in the bobber body.

4. A casting bobber including an elongated buoyant body having a series of line grooves around the lower half of said body in spaced relation, having a grooved shank extending from the lower end of said body and having a longitudinal groove in planal alignment with the groove of said shank and extending substantially the length of said body; a gripping means attached to the upper end of said body and insertable therein; a guide piercing said body near the top thereof; a downturned pin opposite and above said guide; and a retaining sleeve rotatably mounted on said shank to selectively close the groove therein.

5. A casting bobber including an elongated body having a series of line grooves around the lower half of said body in spaced relation and having a longitudinal groove extending substantially the length of said body; a grooved cylindrical shank element insertable in the lower body portion, said groove of said shank being in planal alignment with the groove of said bobber body; a gripping means attached to the upper end of said body insertable thereinto; a member forming a guide on one side and a downturned pin on the other side of said bobber body passing transversely through said bobber body, the external portions of said guide and said downturned pin being in planal alignment with said longitudinal groove; and a retaining sleeve rotatably mounted on said shank to selectively close the groove therein.

References Cited in the file of this patent

UNITED STATES PATENTS

| 584,615 | Wilson | June 15, 1897 |
| 755,683 | Miller | Mar. 29, 1904 |
| 1,885,311 | Whitcomb | Nov. 1, 1932 |
| 2,148,799 | Bilinski | Feb. 28, 1939 |
| 2,413,371 | Parker | Dec. 31, 1946 |
| 2,592,441 | Louthan | Apr. 8, 1952 |
| 2,603,905 | Brzezinski | July 22, 1952 |